(12) United States Patent
Raymond et al.

(10) Patent No.: US 11,821,881 B2
(45) Date of Patent: Nov. 21, 2023

(54) PASSIVE DAMPENING GRADIENT PROPORTIONING VALVE

(71) Applicant: Waters Technologies Corporation, Milford, MA (US)

(72) Inventors: Timothy M. Raymond, Milford, MA (US); Christopher Walden, Milford, MA (US); Sean Anderson, Dedham, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 121 days.

(21) Appl. No.: 17/104,874

(22) Filed: Nov. 25, 2020

(65) Prior Publication Data
US 2021/0156828 A1  May 27, 2021

Related U.S. Application Data

(60) Provisional application No. 62/941,236, filed on Nov. 27, 2019.

(51) Int. Cl.
*G01N 30/32* (2006.01)
*B01D 15/16* (2006.01)
(Continued)

(52) U.S. Cl.
CPC ........... *G01N 30/32* (2013.01); *B01D 15/163* (2013.01); *B01D 15/166* (2013.01);
(Continued)

(58) Field of Classification Search
CPC . B01D 15/163; B01D 15/166; B01F 25/1051; C07D 307/68; C07D 317/60;
(Continued)

(56) References Cited

U.S. PATENT DOCUMENTS 2,902,988 A  9/1959 Rippingille
3,327,729 A  6/1967 Erickson
(Continued)

FOREIGN PATENT DOCUMENTS

CN  109444310 A  3/2019
EP  0830534 A1  3/1998
(Continued)

OTHER PUBLICATIONS

International Search Report and Written Opinion in PCT/US2020/062258 dated Mar. 3, 2021.
(Continued)

*Primary Examiner* — Harshad R Patel
*Assistant Examiner* — Gedeon M Kidanu
(74) *Attorney, Agent, or Firm* — Schmeiser, Olsen & Watts LLP; Victor J. Baranowski

(57) ABSTRACT

Disclosed is a gradient proportioning valve for liquid chromatography that includes a plurality of inlet ports configured to receive a plurality of fluids, a manifold connected to each of the plurality of inlet ports configured to mix the plurality of fluids in a controlled manner to provide a fluid composition, the manifold including a plurality of fluid conduits internal to the manifold, each of the plurality of fluid conduits receiving fluid through a respective one of the plurality of inlet ports, each of the plurality of fluid conduits operatively communicable to a respective actuation mechanism configured to open and close each of the plurality of fluid conduits in a controlled manner, a common outlet port configured to receive the fluid composition, and a passive fluidic dampening system configured to dampen unwanted fluidic pressure pulses in the manifold where at least one of the plurality of fluid conduits is compliant.

18 Claims, 11 Drawing Sheets

(51) Int. Cl.
    *G01N 30/34* (2006.01)
    *G01N 30/20* (2006.01)
    *B01F 25/00* (2022.01)
    *G01N 30/02* (2006.01)

(52) U.S. Cl.
    CPC ......... *B01F 25/1051* (2022.01); *G01N 30/20* (2013.01); *G01N 30/34* (2013.01); *G01N 2030/027* (2013.01); *G01N 2030/205* (2013.01); *G01N 2030/322* (2013.01); *G01N 2030/328* (2013.01); *G01N 2030/347* (2013.01)

(58) Field of Classification Search
    CPC ... F04B 11/00; F04B 11/0008; F04B 11/0091; F04B 13/02; F04B 49/065; F04B 7/04; G01N 2030/027; G01N 2030/205; G01N 2030/322; G01N 2030/326; G01N 2030/328; G01N 2030/347; G01N 30/20; G01N 30/32; G01N 30/34
    See application file for complete search history.

(56) References Cited

U.S. PATENT DOCUMENTS

| | | | |
|---|---|---|---|
| 3,398,689 | A | 8/1968 | Allington |
| 3,985,019 | A | 10/1976 | Boehme et al. |
| 4,045,343 | A | 8/1977 | Achener et al. |
| 4,128,476 | A | 12/1978 | Rock |
| 4,347,131 | A | 8/1982 | Brownlee |
| 4,383,551 | A | 5/1983 | Lynch et al. |
| 4,427,298 | A | 1/1984 | Fahy et al. |
| 4,437,812 | A | 3/1984 | Abu-Shumays et al. |
| 4,448,692 | A | 5/1984 | Nakamoto et al. |
| 4,478,713 | A | 10/1984 | Girot et al. |
| 4,522,231 | A | 6/1985 | Bergmann |
| 4,595,496 | A | 6/1986 | Carson |
| 4,749,976 | A * | 6/1988 | Pichler ................ H01F 7/088 400/157.2 |
| 4,947,893 | A * | 8/1990 | Miller ................ F16K 31/0613 137/625.65 |
| 5,105,851 | A | 4/1992 | Fogelman |
| 5,158,441 | A | 10/1992 | Aid et al. |
| 5,253,981 | A | 10/1993 | Yang et al. |
| 5,494,076 | A | 2/1996 | Knapp |
| 5,755,561 | A | 5/1998 | Couillard et al. |
| 5,862,832 | A * | 1/1999 | Victor .................... G01N 30/34 138/30 |
| 6,116,869 | A * | 9/2000 | Couillard ............ F04B 11/0016 417/442 |
| 6,242,209 | B1 | 6/2001 | Ransom et al. |
| 2005/0013708 | A1 | 1/2005 | Peeler et al. |
| 2008/0099706 | A1 | 5/2008 | Cook et al. |
| 2009/0065724 | A1 | 3/2009 | Mitton et al. |
| 2010/0012192 | A1 | 1/2010 | Dourdeville et al. |
| 2010/0301069 | A1 | 12/2010 | Bensley |
| 2015/0040992 | A1 | 2/2015 | Shreve et al. |
| 2015/0043303 | A1 * | 2/2015 | Shreve ................ G05D 11/133 366/152.2 |
| 2017/0167476 | A1 | 6/2017 | Bozic |
| 2022/0326197 | A1 | 10/2022 | Otsubo et al. |

FOREIGN PATENT DOCUMENTS

| | | | |
|---|---|---|---|
| EP | 1887353 A1 | 2/2008 | |
| JP | 2017115886 A * | 6/2017 | ............. F02M 47/02 |
| WO | 2007119149 A2 | 10/2007 | |

OTHER PUBLICATIONS

International Search Report and Written Opinion in PCT/US2020/062276 dated Mar. 10, 2021.
International Search Report and Written Opinion in PCT/US2020/062297 dated Feb. 26, 2021.
Saunders, D.L., "A Versatle Gradient Elution Device for HPLC," Journal of Chromatographic Science, Mar./Apr. 1977. 8 pages.
Non-Final Office Action in U.S. Appl. No. 17/104,660 dated Jun. 27, 2022.
Restriction Requirement in U.S. Appl. No. 17/104,772 dated Jul. 15, 2022.
Non-Final Office Action in U.S. Appl. No. 17/104,772 dated Sep. 21, 2022.
International Preliminary Report on Patentability in PCT/US2020/062297 dated Jun. 9, 2022.
International Preliminary Report on Patentability in PCT/US2020/062258 dated Jun. 9, 2022.
International Preliminary Report on Patentability in PCT/US2020/062276 dated Jun. 9, 2022.
Final Office Action in U.S. Appl. No. 17/104,772 dated Jan. 9, 2023.
Final Office Action in U.S. Appl. No. 17/104,660 dated Jan. 4, 2023.
Notice of Allowance in U.S. Appl. No. 17/104,660 dated Jun. 30, 2023.
Non-Final Office Action in U.S. Appl. No. 17/104,772 dated Jul. 21, 2023.

* cited by examiner

PASSIVE DAMPENING GRADIENT PROPORTIONING VALVE

RELATED APPLICATIONS

This application is a non-provisional patent application claiming priority to U.S. Provisional Patent Application No. 62/941,236, filed Nov. 27, 2019, entitled "Gradient Proportioning Valve," which is incorporated herein by reference.

FIELD OF THE INVENTION

The invention relates generally to gradient proportioning valves. More particularly, the invention relates to a gradient proportioning valve having passive fluidic dampening features, and associated systems and methods.

BACKGROUND

Gradient proportioning valves (GPVs) are known for use in low pressure mixing liquid chromatography systems (i.e. quaternary systems). U.S. Pat. No. 5,862,832 describes an exemplary prior art GPV. Specifically, the GPV is responsible in the systems for setting the desired solvent composition. A typical GPV includes multiple solenoid valves mounted on a common manifold that open and close at precise times with respect to the system pump cycle. Upon opening and closing of GPV solenoid valves, pressure pulses are introduced to the system. Pressure pulses are also caused by the start and end of the intake stroke during the pump cycle. Such pressure pulses can cause undesirable oscillations in the compositional error of chromatography systems. These oscillations therefore diminish compositional accuracy and performance of a liquid chromatography system.

SUMMARY

In one embodiment, a gradient proportioning valve for liquid chromatography includes a plurality of inlet ports configured to receive a plurality of fluids; a manifold connected to each of the plurality of inlet ports configured to mix the plurality of fluids in a controlled manner to provide a fluid composition, the manifold including a plurality of fluid conduits internal to the manifold, each of the plurality of fluid conduits receiving fluid through a respective one of the plurality of inlet ports, each of the plurality of fluid conduits operatively communicable to a respective actuation mechanism configured to open and close each of the plurality of fluid conduits in a controlled manner; a common outlet port configured to receive the fluid composition; and a passive fluidic dampening system configured to dampen unwanted fluidic pressure pulses in the manifold, wherein the passive fluidic dampening system includes at least one of the plurality of fluid conduits including a compliant portion.

Additionally or alternatively, each of the plurality of fluidic conduits includes a compliant portion.

Additionally or alternatively, the complaint portion is made of a material selected from the group consisting of Polytetrafluoroethylene (PTFE), Flourinated Ethylene Propylene (FEP) and Perfluoroelastomer (FFKM).

Additionally or alternatively, the gradient proportioning valve further includes the plurality of the respective actuation mechanisms, wherein each of the plurality of respective actuation mechanisms is a solenoid valve, and wherein the complaint portion of the at least one of the plurality of fluid conduits is located upstream from one of the solenoid valves.

Additionally or alternatively, the gradient proportioning valve further includes a single accumulator chamber internal to the manifold, wherein each of the plurality of fluid conduits provides fluid to the single accumulator chamber, wherein the single accumulator chamber includes a diaphragm disposed therein, a first side of the diaphragm exposed to an interior of the single accumulator chamber and a second side of the diaphragm exposed to an exterior of the manifold.

Additionally or alternatively, the gradient proportioning valve further includes a plurality modular receiver ports internal to the manifold, each of the plurality of receiving ports in fluidic communication with a respective one of the plurality of fluid conduits.

Additionally or alternatively, the gradient proportioning valve further includes at least one modular flat bottom fitting plug received in the receiving port, the flat bottom exposed to the received fluid from the respective one of the plurality of fluid conduits.

Additionally or alternatively, the gradient proportioning valve further includes at least one modular diaphragm fitting plug received in the receiving port, the diaphragm fitting plug creating an accumulator chamber internal to the manifold in fluidic communication with the respective one of the plurality of fluid conduits.

Additionally or alternatively, the gradient proportioning valve further includes at least one accumulator chamber internal to the manifold, wherein at least one of the plurality of fluid conduits provides fluid to the at least one accumulator chamber, wherein the fluidic dampening system includes the at least one accumulator chamber having a ribbed diaphragm disposed therein.

Additionally or alternatively, the fluidic dampening system includes at least one of the respective actuation mechanisms having a compliant seal made of at least one of PTFE, FEP and FFKM.

Additionally or alternatively, the fluidic dampening system includes at least one of the plurality of fluid conduits including a bent pulse dampening flow geometry configured to mitigate fluidic pressure pulses.

Additionally or alternatively, the fluidic dampening system includes a plurality of beads located within at least one chamber in the manifold, or within at least one of the plurality of fluid conduits, the plurality of beads configured to reduce pulse amplitude.

In another embodiment, a method of mixing fluid in liquid chromatography includes: providing a gradient proportioning valve; receiving a plurality of fluids in a plurality of inlet ports of the gradient proportioning valve; mixing the plurality of fluids in a controlled manner within a manifold of the gradient proportioning valve to provide a fluid composition, the manifold including a plurality of fluid conduits, wherein at least one of the plurality of fluid conduits is a compliant fluid conduit; opening and closing each of the plurality of fluid conduits in a controlled manner; outputting the fluid composition from a common outlet port of the gradient proportioning valve; and dampening the unwanted fluidic pressure pulses in the manifold with the compliant fluid conduit.

Additionally or alternatively, the opening and closing each of the plurality of fluid conduits in a controlled manner is performed by a respective solenoid valve, and the method further includes: absorbing unwanted fluidic pressure pulses created by the opening and closing of at least one of the respective solenoid valves with the compliant fluid conduit located upstream from the at least one of the respective solenoid valves.

Additionally or alternatively, each of the plurality of fluid conduits is a compliant fluid conduit, and the method further includes dampening the unwanted fluidic pressure pulses in the manifold with each of the plurality of compliant fluid conduits.

Additionally or alternatively, the method further includes dampening unwanted fluidic pressure pulses in the manifold with a single accumulator chamber having a diaphragm disposed therein.

Additionally or alternatively, the method further includes dampening the unwanted fluidic pressure pulses with a compliant seal made of at least one of PTFE, FEP and FFKM.

Additionally or alternatively, the method further includes using a bent flow geometry within the manifold to mitigate the unwanted fluidic pressure pulses.

Additionally or alternatively, the method further includes dampening the unwanted fluidic pressure pulses with a plurality of beads located within at least one chamber of the manifold, or within at least one of the plurality of fluid conduits.

In another embodiment, a liquid chromatography system includes a gradient proportioning valve for liquid chromatography includes a plurality of inlet ports configured to receive a plurality of fluids; a manifold connected to each of the plurality of inlet ports configured to mix the plurality of fluids in a controlled manner to provide a fluid composition, the manifold including a plurality of fluid conduits internal to the manifold, each of the plurality of fluid conduits receiving fluid through a respective one of the plurality of inlet ports, each of the plurality of fluid conduits operatively communicable to a respective actuation mechanism configured to open and close each of the plurality of fluid conduits in a controlled manner; a common outlet port configured to receive the fluid composition; and a passive fluidic dampening system configured to dampen unwanted fluidic pressure pulses in the manifold, wherein the passive fluidic dampening system includes at least one of the plurality of fluid conduits including a compliant portion. The liquid chromatography system further includes an injector; a separation column; and a detector.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

Figure 2:
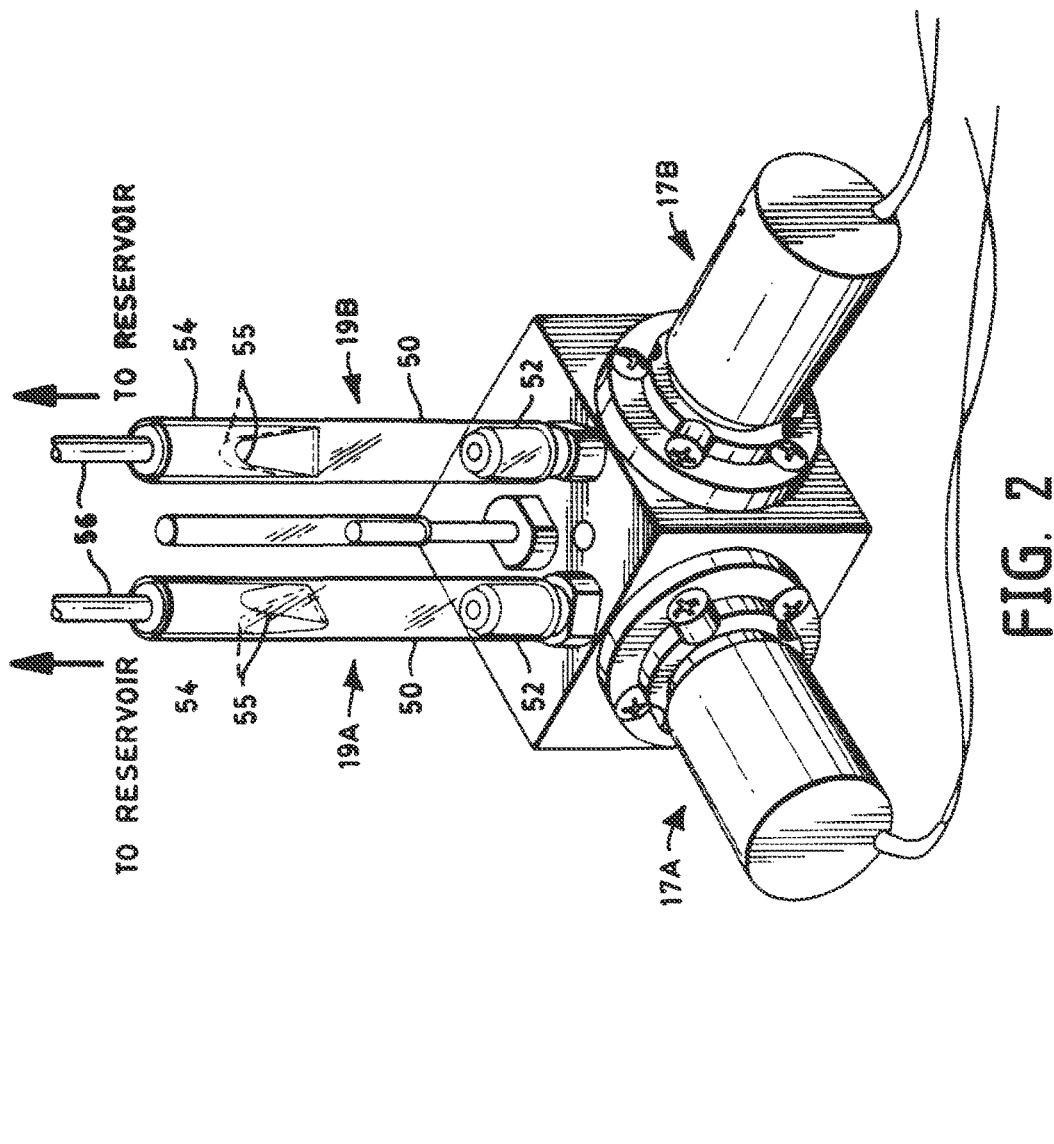
FIG. 2 depicts a perspective view of a gradient proportioning valve, in accordance with one embodiment.

A gradient proportioning valve accommodates the flow of fluids from external reservoirs into the valve for mixing in appropriate proportions to form a liquid composition. In an actual embodiment, such a valve may include four inlet valves ported to a common outlet, the embodiment shown hereinbelow in FIG. 2 shows two inlet valves ported to a common outlet. In terms of functionality, each inlet valve may be a normally closed, solenoid actuated diaphragm valve that is switched in a controlled manner to provide the appropriate amount of fluid required in mixing the liquid composition. The function of the overall valve is to provide a continuous stream of a compositionally accurate mixture of components, such as solvents in a high pressure liquid chromatography (HPLC) implementation. The mixture may be provided from the common outlet under flowing conditions, while not interfering with the flow rate of the fluid input system, and without changing or otherwise affecting the quality/composition of the fluids input for mixing.

Embodiments of the gradient proportioning valve described herein may be configured to passively dampen or otherwise reduce pressure pulses that occur due to the opening and closing of channels in the fluidic systems of the valve, and in the valve itself. Such pressure pulses have been found to cause large, sinusoidal oscillations in compositional error. Passive fluidic dampening may include dampening these fluidic pressure pulses without an active, powered, and/or controlled device. Thus, the gradient proportioning valves described herein may be configured to provide improved compositional accuracy across an entire solvent composition range. This improved compositional accuracy may be particularly important at higher flow rates.

Figure 1:
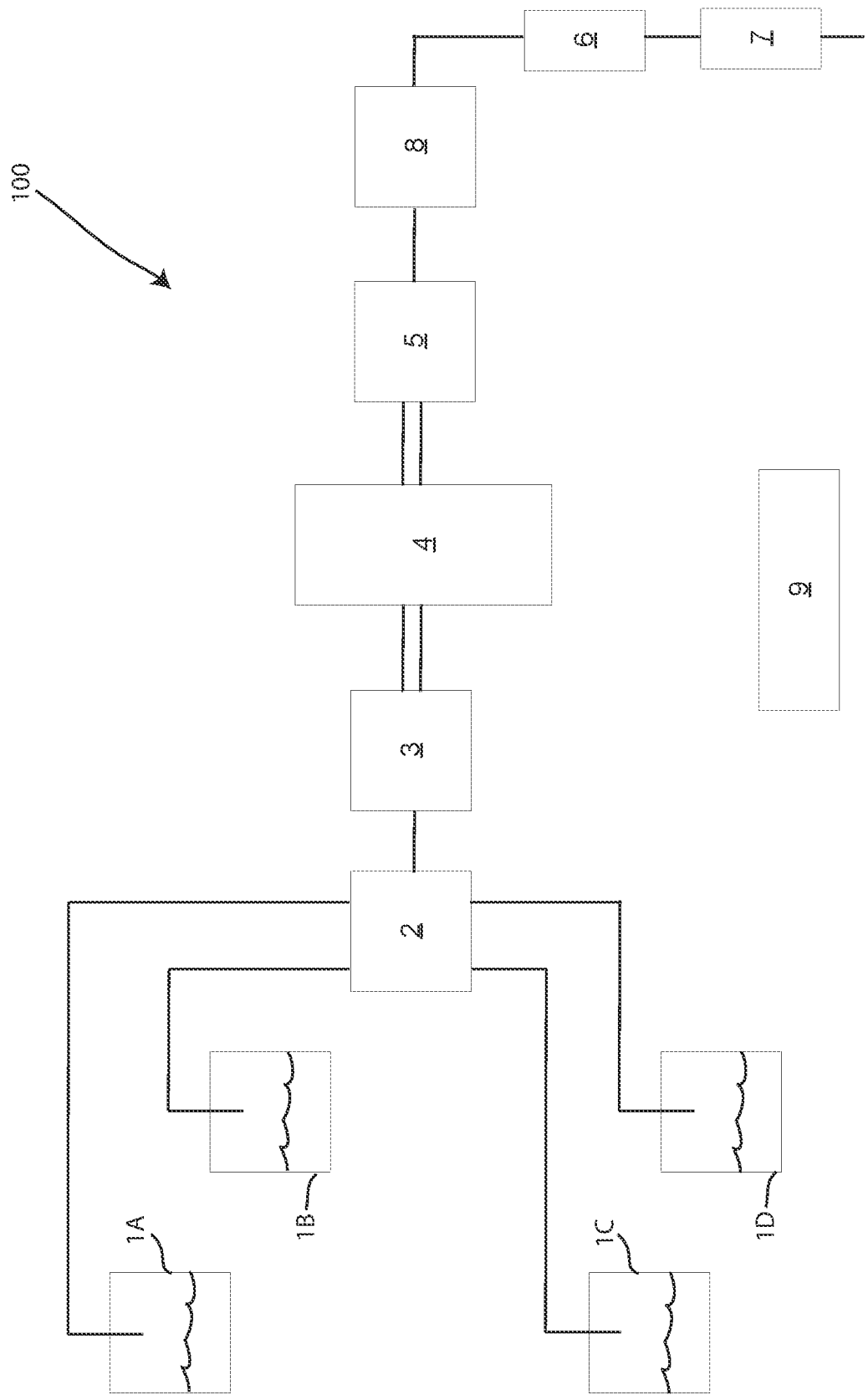
FIG. 1 depicts a block diagram of a liquid chromatography apparatus, in accordance with one embodiment.

FIG. 1 is a block diagram of an exemplary liquid chromatography system 100, suitable for preparative- or process-scale liquid chromatography, in accordance with one embodiment of the invention. The system 100 is an exemplary system within which gradient proportioning valves may be included according to the embodiments described herein. The apparatus 100 includes four solvent reservoirs 1A, 1B, 1C, 1D, a gradient proportioning valve 2, an inlet manifold valve 3, a pump 4, a solvent mixer 5, an injector 8, a separation column 6, a detector 7, and a control unit 9. The gradient proportioning valve 2 represents a valve that includes one or more of the dampening features described herein. Thus, the gradient proportioning valve 2 may be any of the gradient proportioning valves shown in FIGS. 2-10B and described herein below.

In operation, the gradient proportioning valve 2 and the pump 4, in response to control of the control unit 9, select and draw one or more solvents from the reservoirs 1A, 1B, 1C, 1D. The gradient proportioning valve 2 may be operated, in response to control of the control unit 9, to provide a selected solvent composition, which is optionally varied in time, for example, to implement gradient-mode chromatography. The solvent mixer 5 is any suitable mixer, including known passive and active mixers. The injector is any suitable injector 8, including known injectors, for injecting a sample into the solvent flow. The injector 8 is optionally disposed at alternative locations in the solvent flow path, as will be understood by one having ordinary skill in the liquid-chromatography arts. The inlet manifold valve 3 is connected to an outlet tube from the gradient proportioning valve 2, and to two inlet tubes connected to the pump 4, to supply solvent to the two piston chambers. The inlet manifold valve 3 optionally includes a sample injector, to inject samples into the solvent prior to its entry into the pump 4. The control unit 9—including, for example, a personal computer or workstation—receives data and/or provides control signals via wired and/or wireless communications to, for example, the gradient-proportioning valve 2, the pump inlet manifold 3, the pump 4, and/or the detector 7. The control unit 9 supports, for example, automation of sample processing. The control unit 9, in various illustrative embodiments, is implemented in software, firmware, and/or hardware (e.g., as an application-specific integrated circuit). The control unit 9 includes and/or is in communication with storage component(s).

Suitable implantations of the control unit 9 include, for example, one or more integrated circuits, such as microprocessors. A single integrated circuit or microprocessor in some alternative embodiments includes the control unit 9 and other electronic portions of the apparatus 100. In some embodiments, one or more microprocessors implement software that enables the functions of the control unit 9. In some embodiments, the software is designed to run on general-purpose equipment and/or specialized processors dedicated to the functionality herein described.

In some implementations of the system 100, the control unit 9 includes a user interface to support interaction with the control unit 9 and/or other portions of the system 100. For example, the interface is configured to accept control information from a user and to provide information to a user about the system 100. The user interface is used, for example, to set system control parameters and/or to provide diagnostic and troubleshooting information to the user. In one embodiment, the user interface provides networked communication between the system 100 and users located either local to the operating environment or remote from the operating environment. The user interface in some implementations is used to modify and update software. In view of the description of illustrative embodiments provided herein, it will be apparent to one having ordinary skill in the separation arts that various other configurations and implementations of control units can be utilized in other embodiments of the invention to provide automated control of process-scale and preparative-scale chromatography.

The pump 4 may be configured to provide solvent at pressures of at least 500 psi, or 1,000 psi, or 5,000, psi 10,000 psi or greater. The pump includes any suitable piston-based pump, including known pumps, such as available from Waters Corporation, Milford, Mass. The column 6 is any column suitable for process-scale and preparative-scale chromatography. The column contains, for example, any medium suitable for such a purpose, including known media. The sorbent material is selected from any suitable sorbent material, including known materials such as silica or a mixture of silica and a copolymer such as an alkyl compound. The solvents are any solvents suitable to a desired separation process, including known solvents.

Again, the system 100 described above is meant to be an exemplary liquid chromatography system in which various embodiments of the gradient proportioning valves may be deployed. However, the gradient proportioning valves described herein may be implemented in any system in which gradient fluid mixing is performed. For example, in a liquid chromatography quaternary system, after the solvent reservoirs 1A, 1B, 1C, 1D, the next component the solvent goes into may be a degasser chamber. From there, the solvent may enter the gradient proportioning valve 2. After the gradient proportioning valve 2, the solvent may then go through a check valve to the pump (i.e. with no inlet manifold valve). Any liquid chromatography system configurations which may deploy a gradient proportioning valve are contemplated for incorporation of the principles described herein.

Referring now to FIG. 2, a perspective view of a gradient proportioning valve 2A is shown, in accordance with one embodiment. The gradient proportioning valve 2A includes accumulators 19A, 19B located directly adjacent to switching valves 17A, 17B, on the side closest to the reservoirs 10A, 10B. It should be understood that embodiments of the gradient proportioning valve 2A may include two additional accumulators and switching valves (not shown) located on the two open sides of the gradient proportioning valve 2A, thereby connecting the gradient proportioning valve 2 to two additional reservoirs, such as the reservoirs 1C, 1D shown in FIG. 1. Each of the accumulators 19A, 19B may include a soft-walled flexible plastic tube 50 of generally circular cross-section. As shown, the accumulator tube 50 may be adapted at an end closest to the valve inlet to snugly slide over a rigid plastic connector 52. A connecting tube 54 may be implemented at the opposite end of the accumulator tube to hold a relatively long length of flow tubing 56 that connects the valves with the reservoirs 1A, 1B. The end of the accumulator tube adjacent to the connecting tube may be caused to assume approximately the cross-section of a flattened ellipse 55 which may allow a significant internal volume change to occur in the accumulator tube, with little change in pressure thereby allowing the accumulator to overcome the effects of hydraulic inertia.

Figure 3:
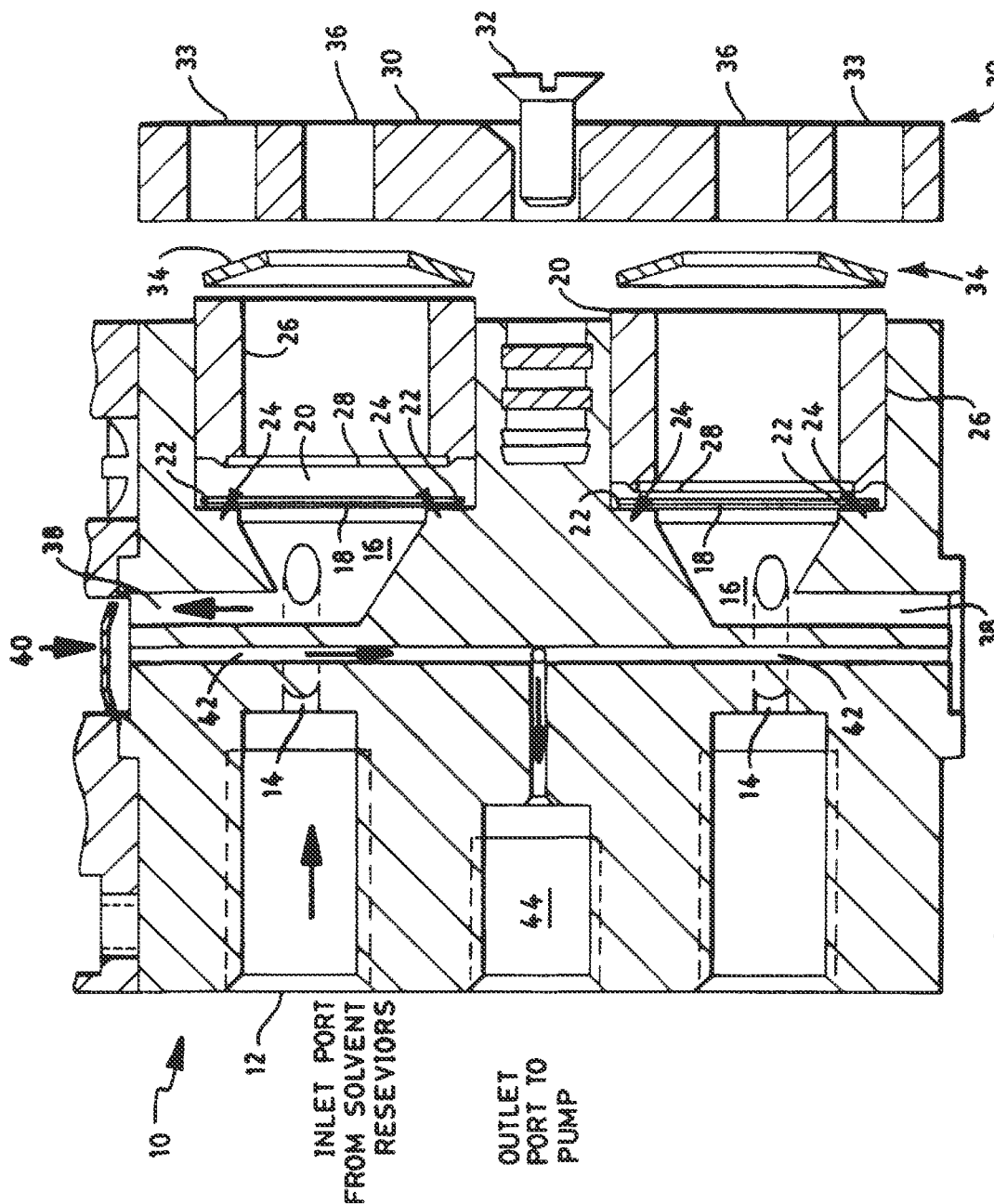
FIG. 3 depicts a side cross sectional view of the gradient proportioning valve of FIG. 2, in accordance with one embodiment.

FIG. 3 depicts a side cross sectional view of the gradient proportioning valve 2A of FIG. 2, in accordance with one embodiment. The gradient proportioning valve 2A includes a valve manifold 10 that accommodates the flow of fluids from external reservoirs (not shown). For the sake of clarity of the discussion hereinafter, the illustrative valve described herein has the capacity to mix only two input fluid streams. However, the features described herein may be applied to valves mixing, for example, four or more input fluid streams. The input fluid streams to be mixed are received from the reservoirs and are introduced into the valve at inlet ports 12. Fluids from the respective reservoirs, such as solvents used in HPLC as known in the art, flow into respective inlet ports 12 and thereafter flow through respective inlet conduits 14 in the manifold 10 into respective accumulator volumes or chambers 16.

The integral accumulator chambers 16, as well as the inlet ports 12 and inlet conduits 14, are appropriately dimensioned as a function of the flow rate of the valve application. The chamber 16 is frustum-shaped having a conical-base opposed to the inlet conduit 14. The chamber is shaped to maximize the surface area of the diaphragm (for compliance), and the inlet conduit 14 is positioned to allow for the best swept volume geometry. Accordingly, the chamber 16 also has a smooth transition from larger to smaller cross-section. The placement of the chamber is such that the fluidic resistance between a valve diaphragm 40 (discussed hereinafter) and the accumulator is minimized. Fluid flowing through the conduit 14 flows perpendicular to the conical-base, into the chamber 16 to confront the base or back of the chamber 16.

An accumulator diaphragm 18 is positioned at the conical-base or back of the chamber 16, opposite the inlet conduit 14. The diaphragm 18 in this illustrative embodiment, is a 0.002 inch thick film formed of Polytetrafluoroethylene (PTFE) laminated on each side with Fluorinated Ethylene Propylene (FEP).

The diaphragm, as with all components in the fluid path of the present illustrative embodiment, is formed of materials that are functionally unaffected by a full range of organic solvents and aqueous solutions of acids, bases, salts, surfactants, etc. and other phase modifiers that may be used in any mode of liquid chromatography. The diaphragm 18 effects a membrane or compliant member at the back of the accumulator chamber 16 to allow internal volume changes in the chamber to occur with little change in pressure. Accordingly, as with the less advantageous accumulator tubes of the prior art, the valve can overcome the effects of hydraulic inertia. The compliance and damping of the diaphragm are optimized for the applications flow characteristics, as will be appreciated by those skilled in the art.

An oversized bore 20 behind the back of the conical-base or back of the accumulator chamber 16 is configured to receive the diaphragm 18 for clamping and sealing the diaphragm tightly therein. A seating surface 22 interior to the bore 20 provides an abutment against which the diaphragm seats. A sealing groove 24 is disposed in the seating surface 22 and provides a portion of the single seal effected in the implementation according to the invention. A cylindrical sealing plug 26 formed of stainless steel, includes a sealing ridge 28 that fits tightly into the sealing groove 24 to seal the diaphragm in the bore 20 when the plug 26 is engaged against the seating surface 22 with the diaphragm sandwiched therebetween.

Preferably, the sealing plug 26 is dimensioned to fit snugly, yet slidably within the bore 20. The plug 26 is held in place by a clamping plate 30 which is mechanically attached to the valve manifold such as by a screw 32. Additional mounting holes 33 are provided in the clamping plate 30 to facilitate the mechanical fastening of the clamping plate to the valve manifold 10. In this illustrative embodiment, resilient members such as belleville springs 34 or washers are disposed between the sealing plug 26 and the clamping plate 30, to provide some resiliency.

The diaphragm according to the invention overcomes hydraulic inertia while minimizing the volume of fluid in the valve that is exposed to potential air permeation, by limiting the surface area of the diaphragm that is exposed to ambient air. In contrast to the prior art wherein the entirety of the accumulator tubes were exposed and the volumes of fluid therethrough subjected to ambient air permeating the tubes, the diaphragm according to the present invention is only exposed to ambient in a limited manner. Atmospheric ports 36 are provided in the clamping plate 30 to permit ambient air at the back of the diaphragm 18. While exposure to ambient air is necessary for the diaphragm to perform its intended function, the reduced surface area exposed within the atmospheric ports significantly limits permeation of air through the diaphragm.

As briefly described hereinbefore, input fluid streams to be mixed are received from reservoirs and are introduced into the valve manifold 10 at inlet ports 12. Fluids from the respective reservoirs flow into respective inlet ports 12 and thereafter flow through respective inlet conduits 14 in the manifold 10 into respective accumulator volumes or chambers 16. The inlet conduits 14 may be internal to the housing of the gradient proportioning valve 2A, and may be compliant conduits made of a compliant material, as described in more detail herein below. Thus, the inlet conduits 14 may be configured to expand or contract as a result of internal fluid pressure therein.

In the respective integral accumulator chambers 16 the fluids to be mixed encounter the compliant diaphragm which allows internal volume changes in the chambers to occur with little change in pressure so that the valve can overcome the effects of hydraulic inertia. The fluids to be mixed flow out of the chambers 16 through chamber ports 38 whereupon the fluids are available at switched valve diaphragms 40. The chamber ports 38 may be compliant fluidic conduits internal to the housing or outer body of the gradient proportioning valve 2A. The chamber ports 38 may be configured to expand or contract depending on the fluidic pressure of the fluid therein. The valve diaphragms are reciprocated by switched valves as known in the art. The controlled switching of the valve diaphragms determines the proportion of a respective fluid that is received in a common port 42 within the valve manifold 10. The respective fluids are mixed in their respective proportions in the common port 42 and are available at an outlet port 44 for downstream processing as known in the art. Similar to the camber ports 38 and the inlet conduits 14, the common port 42 may be located internal to the housing or body of the gradient proportioning valve 2A and may be a compliant fluidic conduit that is configured to expand or contract with changes to fluidic pressure therein. The compliance of the chamber ports 38 and or inlet conduits 14 and/or common ports 42 may comprise a passive fluidic dampening system configured to dampen fluidic pressure pulses as described herein.

Although only a two input valve is described in the illustrative embodiment herein, it will be appreciated that the concepts according to the invention could be implemented in a valve having any number of inlet ports for mixing a liquid composition.

While the diaphragm described herein is formed of FEP-PTFE-FEP laminated, it will be appreciated that other materials can be implemented to effect a diaphragm, such as thin stainless steel, various composite materials, rubber or the like.

Although the sealing plug in the illustrative embodiment is a cylindrical plug formed of stainless steel, it will be appreciated that alternative sealing mechanisms can be implemented while permitting ambient pressure at the back of the diaphragm, such as spongy materials, cylindrically shaped composite material or the like. Furthermore, while the sealing plug effects a tight seal by having a sealing ridge that seats in a sealing groove in a bore receiving the plug, it will be appreciated that the groove could be in the plug and the ridge on a surface of the bore.

The gradient proportioning valve 2A thus includes a passive fluidic dampening system including one or more dampening mechanisms, systems or methods, configured to passively dampen unwanted fluidic pressure pulses in the manifold. Thus, the gradient proportioning valve 2A may be configured to dampen or otherwise reduce pressure pulses that occur due to the opening and closing of channels in the fluidic systems associated with the valve 2A, and within the valve 2A itself. In particular, the fluidic dampening system may be configured to passively dampen the unwanted fluidic pressure pulses created by the solenoid valves 17A, 17B of the valve 2A. The gradient proportioning valve 2A may thereby be configured to provide improved compositional accuracy across an entire solvent composition range.

In one or more embodiments, the fluidic dampening system includes at least one of the plurality of fluid conduits including a compliant portion. For example, any of the inlet conduits 14, the chamber ports 38 and/or the common port 42 may be made of a compliant material so that fluid passes directly through a channel or conduit made of a compliant material. Compliance herein may include materials such as Polytetrafluoroethylene (PTFE), Flourinated Ethylene Propylene (FEP) or perfluoroelastomer (FFKM) or materials having similar Young's Modulus'. Compliance herein defines materials that undergo elastic deformation due to force or pressure at the pressures experienced by a liquid chromatography system. Thus, compliant materials in the valves herein may flex when force is applied, but return to its original shape undeformed after the force is halted. Compliance may further allow the channels 14, 38, 42 to expand with increased pressure, and contract with reduced pressure. The complaint materials herein may be configured to achieve force and motion transmission through elastic body deformation from the pressure of the internal fluid within the conduit. Thus, when force or pressure occurs within the conduits, the compliance of the material will cause the channel to undergo elastic body deformation, which does not cause permanent or plastic deformation. When the force or pressure is thereby reduced, the conduits may be configured to return to their original form.

The compliance of the channels described herein, including that in one or more of the channels 14, 38, 42, may be configured to undergo this elastic body deformation under pressure ranges found within those channels of the GPV. Operating pressure ranges in the GPV may be between -20.0 to 20 pounds per square inch (psi). Pressure pulses from valve actuation may be, for example, 5 psi or less. In exemplary embodiments, the settling time after a pressure pulse may be less than one second. In other embodiments, the operating pressure ranges of a GPV may be narrowed, for example, between 10 psi to −15 psi. Likewise, the pressure pulses may be even less than 5 psi, for example, may take the form of about 4 psi or about 3 psi. The settling time may also be less than a second; for example 0.75 seconds or 0.5 seconds.

Still further, exemplary compliances of the compliant channels 14, 38, 42 are contemplated. In one embodiment, the compliant channels 14, 38, 42 may have a compliance greater than 0.1 µL/psi (e.g. for every psi increase in pressure, the channel may expand to accommodate 0.1 greater µL or more). In some embodiments compliance may be at least 0.5 µL/psi, at least 0.75 µL/psi, or at least 1 µL/psi.

Thus, the compliance of the channel may act as a fluidic capacitor that dampens pulsations in the system. While a compliant fluidic conduit may be applied to the embodiment shown in FIG. 3, compliant fluidic conduits within the valve may be included on any of the valve embodiments described herein. Any contemplated gradient proportioning valve configuration consistent with the embodiments described herein may include compliant fluidic conduits.

Still further, in one or more embodiments, the fluidic dampening system includes at least one of the respective actuation mechanisms having a compliant seal, for example made of a compliant material such as PTFE, FEP or FFKM. For example, in the embodiment shown in FIG. 3, a conical sealing poppet (not shown) that seals off channel 42 at the solenoid switched valve diaphragm 40 (as known the art of solenoid valves) may be replaced or modified with a more compliant material. In one embodiment, a secondary seal may surround or otherwise modify the conical sealing poppet to absorb pulses upon opening and/or closing of the solenoid seal.

Figure 4:
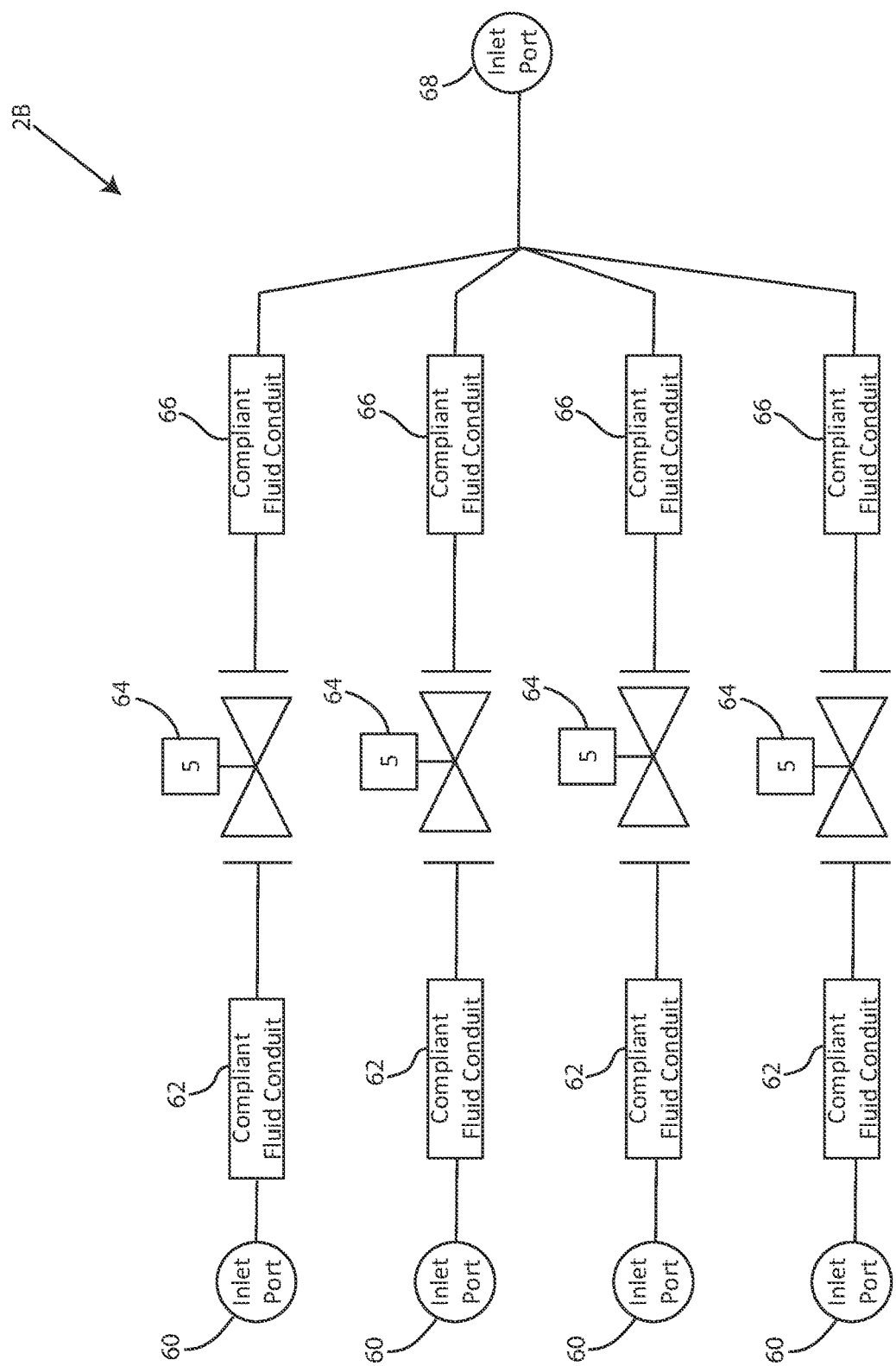
FIG. 4 depicts a schematic view of a gradient proportioning valve having compliant fluidic conduits, in accordance with one embodiment.

FIG. 4 depicts a schematic view of a gradient proportioning valve 2B having compliant fluidic conduits 62, 66, in accordance with one embodiment. The gradient proportioning valve 2B is shown including four inlet ports 60. Each respective inlet port 60 provides fluid through a complaint fluid conduit 62. The respective compliant fluid conduits 62 are configured to provide fluid from the respective inlet ports 60 to respective solenoid valves 64. The respective solenoid valves 64 thereafter provide fluid to another respective compliant fluid conduit 66. From the compliant fluid conduits 66, the fluid may then converge into a single outlet port 68. A single converged fluid conduit may also be provided prior to the single outlet port 68, which may also be made of a compliant material. The compliant fluid conduits 62 and the compliant fluid conduits 66 may each be made of the same materials described hereinabove with respect to the inlet conduits 14, the chamber ports 38 and/or the common port 42.

Unlike FIG. 3, in this embodiment sufficient pressure dampening may be provided by the compliant material in the passive fluidic dampening system by some or all of the fluidic conduits within the valve 2B such that the accumulator chambers 16 is not be unnecessary. Further, in other embodiments, it may be possible that some but not all of the various fluid conduits internal to the housing of the gradient proportioning valve 2B are compliant. For example, only the fluid conduits 66 located downstream from the solenoid valves 64 may be compliant, while the upstream conduits 62 connecting the inlet 60 with the solenoid valves 64 may be made from a typical fluidic channel material that is non-flexible and non-expanding under the pressures of the system. Alternatively, only the fluid conduits upstream from the solenoid valves may be compliant.

In some embodiments, the compliant conduits may be particularly effective upstream of the solenoid valves. There, the compliant conduits may be configured to mitigate the pressure pulses, act as flow buffers, and improve response time. In other embodiments, compliant conduits could be located after the solenoid valves, but before the mixing point in the GPV. Whatever the embodiment, the complaint conduits are located before the mixing point of the GPV. After the mixing point, the compliant conduits might negatively impact the solvent metering. In some embodiments, the entirety of a conduit may be made of the compliant material, or an entire wall(s) of the fluidic channel being made from the compliant material such that the pulse dampening feature is in-line with the flow rather than having the enter a separate accumulator chamber.

Figure 5:
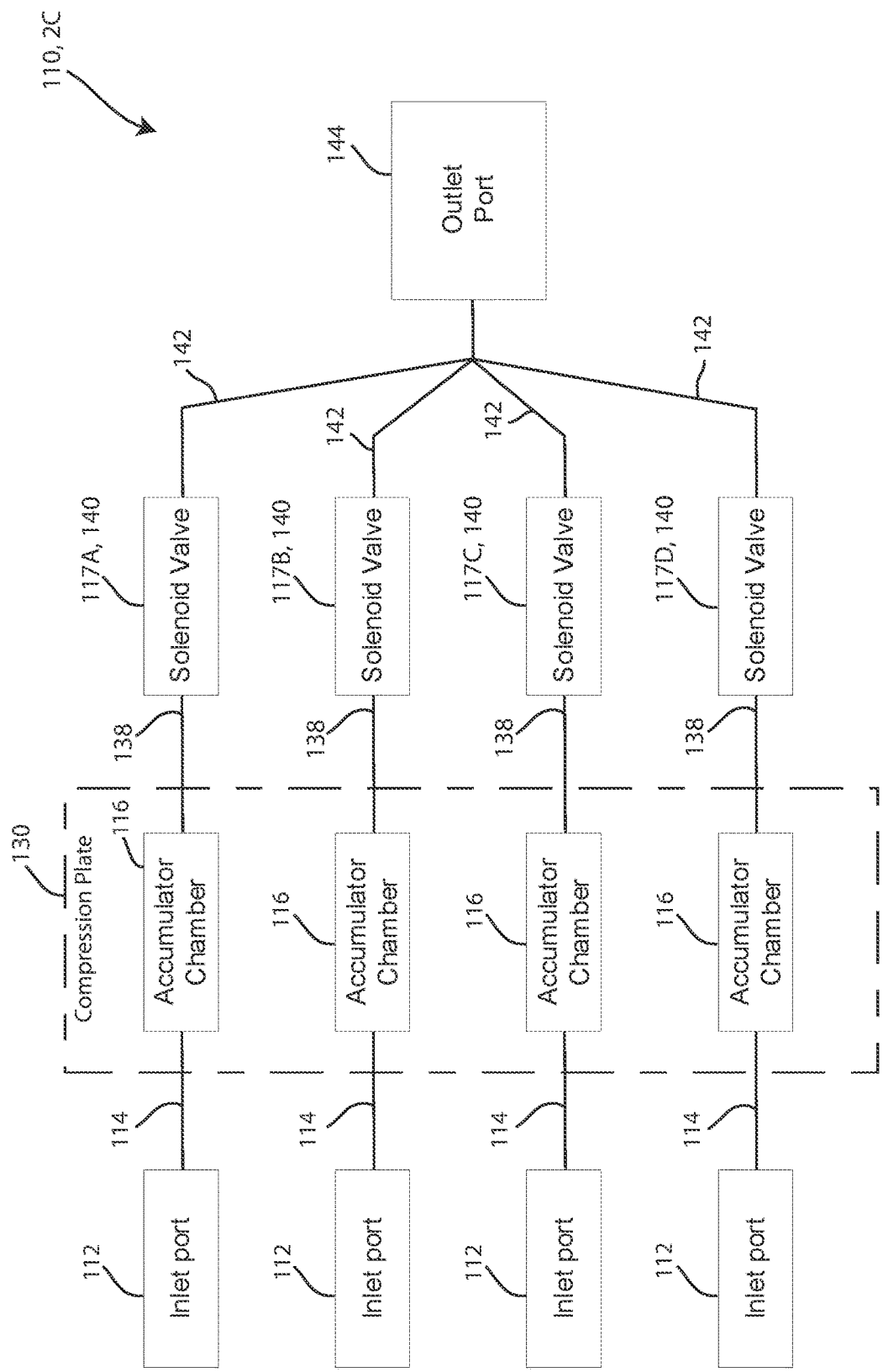
FIG. 5 depicts a schematic view of a gradient proportioning valve having four inlets, in accordance with one embodiment.

FIG. 5 depicts a schematic view of a gradient proportioning valve 2C having a manifold 110 which may include the same or similar features to the manifold 10 but may have four inlet ports 112 for combining with a single outlet port 144, in accordance with one embodiment. Each inlet port 112 is connected to a respective accumulator chamber 116 via a respective inlet conduit 114. As shown, the accumulator chambers may be attached or otherwise connected to the manifold 110 via a compression plate 116. Chamber ports 38 connect the respective accumulator chambers 116 to solenoid valves 117A, 117B, 117C, 117D and their respective switched valve diaphragms 140. After passing the switched valve diaphragms 140 of the respective solenoid valves 117A, 117B, 117C, 117D, fluids are received in ports 42 which combine prior to the outlet port 144 for downstream processing.

In one or more embodiments, the fluidic dampening system includes a plurality of beads located within at least one chamber, such as the integral accumulator chambers 16 within the manifold 10. The plurality of beads may be spherical in shape, or may each be any round shaped object configured to reduce pulse amplitude of fluidic pressure pulses. The plurality of beads may additionally or alternatively be located within any of the fluidic conduits within the manifold 10, such as the inlet conduits 14 and/or the chamber ports 38 and/or the common port 42. The plurality of beads may be disposed within the manifold 10 such that they occupy the volume of whatever space they inhabit, such that the plurality of beads do not move significantly with respect to the manifold 10 as the manifold 10 is moved, shaken, or otherwise subjected to force.

In some embodiments, the plurality of beads may be disposed within each fluidic path (i.e. the path from one of the inlet ports 12 to the outlet port 44) at the same location and in the same manner (number of beads, size of beads, etc). In other embodiments, each respective fluidic path may include its own bead configuration. For example, a first fluidic path coming from a first inlet port may include a plurality of beads of a first diameter in accumulator chamber 16 of the first fluidic path. A second fluidic path may include no beads, while a third and a fourth fluidic path may include beads of a different diameter in their accumulator chambers 16.

The fluidic dampening system may include any type of beads, any size of beads, any material of beads, any amount of beads, disposed at any location, for any given fluidic path. While the plurality of beads has been described with reference to FIG. 5, the plurality of beads described herein may be utilized in combination with any of the other gradient proportioning valve embodiments described herein, or combinations thereof.

Figure 6:
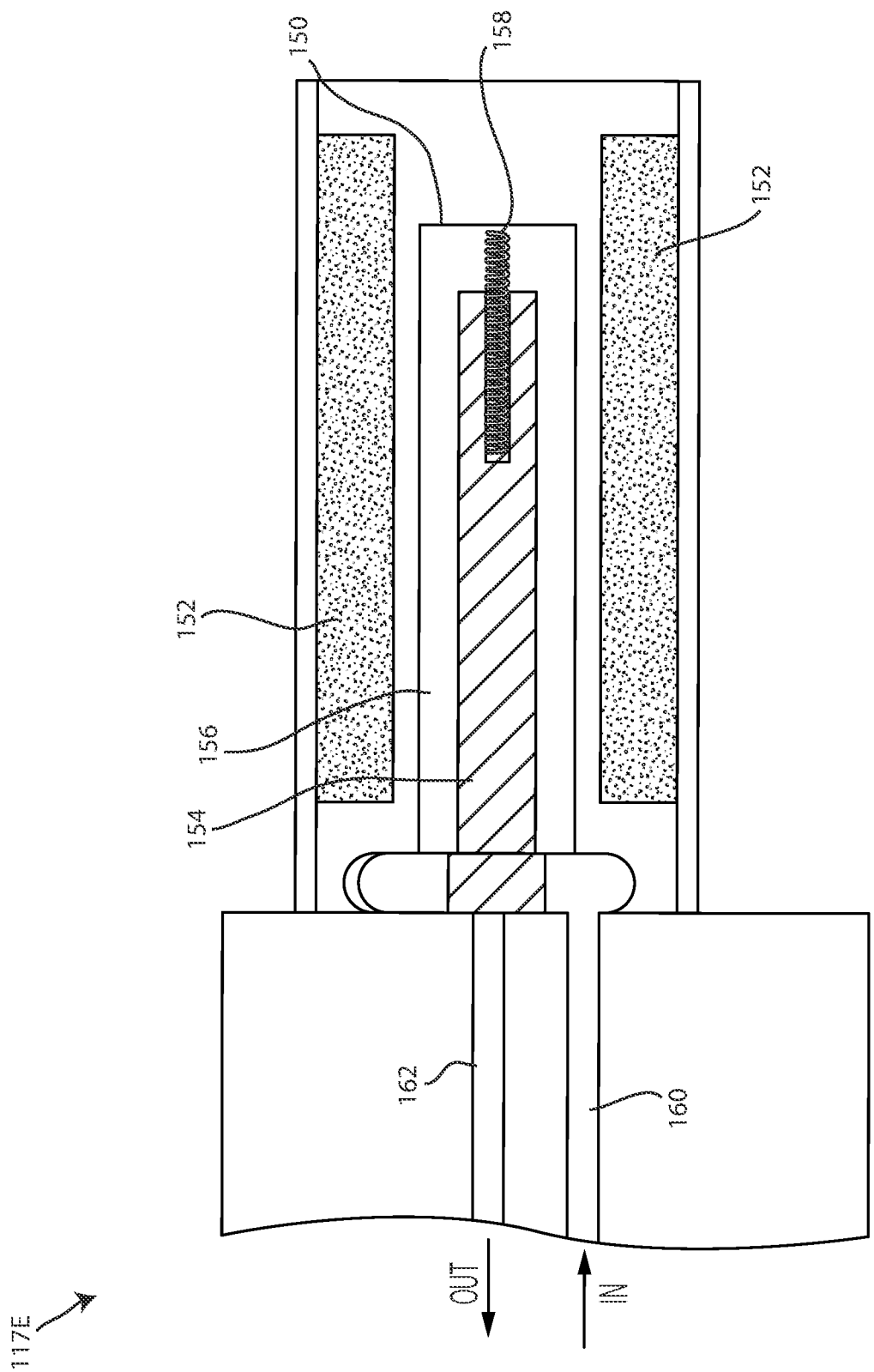
FIG. 6 depicts a side cross sectional view of a solenoid valve having an energy absorbing solenoid armature stop, in accordance with one embodiment.

Referring now to FIG. 6, a side cross sectional view of a solenoid valve 117E is shown having an energy absorbing solenoid armature stop 150, in accordance with one embodiment. The solenoid valve 117E includes a solenoid 152 surrounding an armature 154. The armature 154 is disposed within a chamber 156 surrounding the armature 154. A spring mechanism 158 is located at an end of the chamber 156. When the solenoid 152 is activated, the armature 154 is configured to move toward the energy absorbing armature stop 150 to open the valve 117E and allow fluid to move through the valve 117E from a fluidic inlet 160 to a fluidic outlet 162. In this embodiment, the fluidic dampening system of a contemplated gradient proportioning valve, such as the valve 2A or 2B, includes the energy absorbing solenoid armature stop 150 located at an end of where the armature 154 would otherwise contact when the valve is in an open state. The energy absorbing armature stop 150 may be a deformable or compliant material configured to dampen the hard stop of the armature 154 against the wall of the chamber 156 when the spring mechanism 158 is compressed. The solenoid armature stop 150 may be made of any polymeric, elastomeric, or composite material, such as, but not limited to urethane, FFKM, silicon, or the like. It should be understood that one or more of the solenoid valves 117E may be used in any of the gradient proportioning valves described herein.

Figure 7:
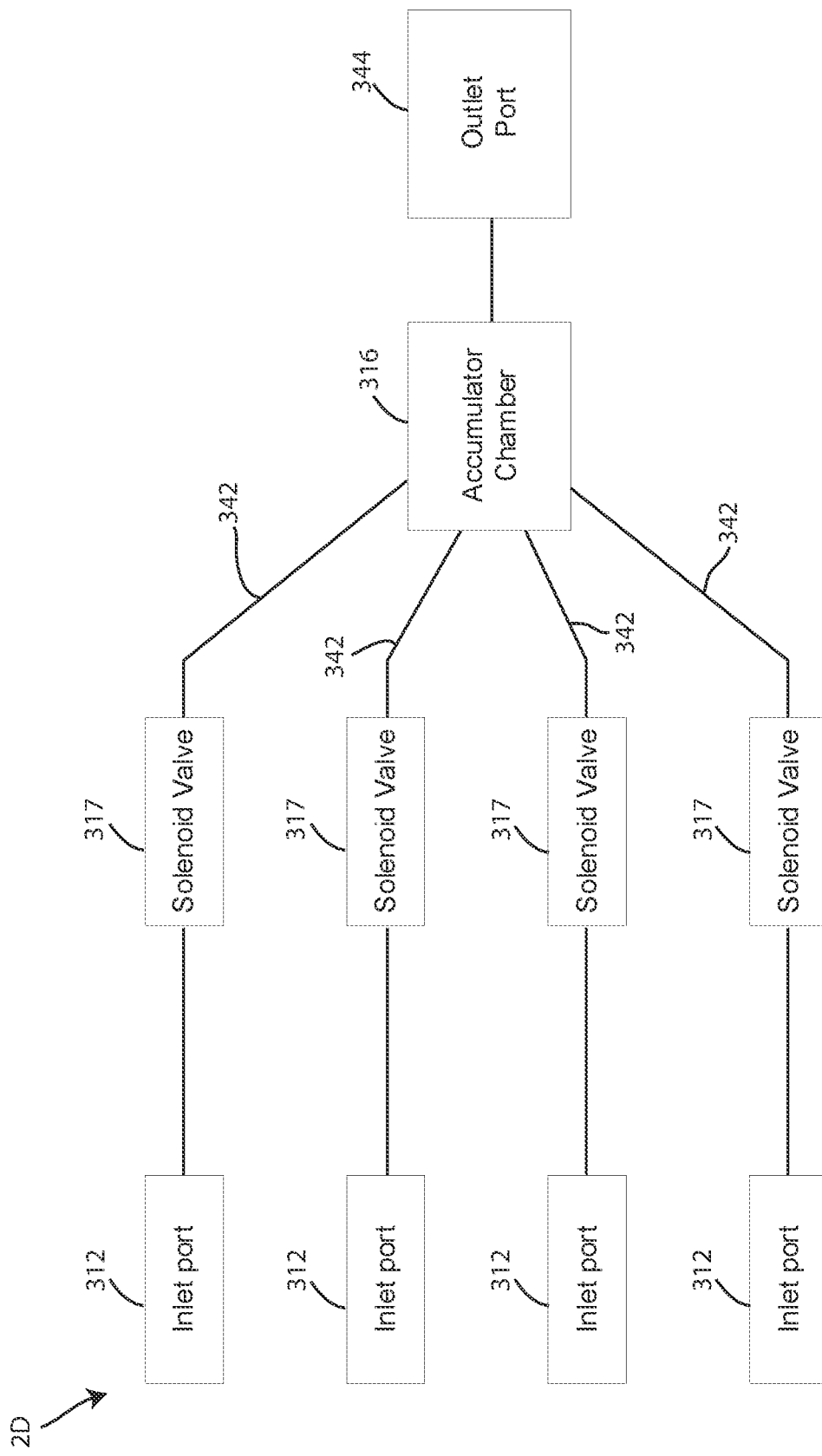
FIG. 7 depicts a schematic view of another gradient proportioning valve having a single accumulator chamber, in accordance with one embodiment.

FIG. 7 depicts a schematic view of another gradient proportioning valve 2D having a single accumulator chamber 316, in accordance with one embodiment. The gradient proportioning valve 2D includes a manifold 310 having four inlet ports 312, each connected to a respective solenoid valve 317 through respective inlet conduits 314. The solenoid valves 317 each include a port 342 that transfers fluid to the single accumulator chamber 316. The single accumulator chamber 316 includes a diaphragm disposed therein. Like the accumulator chambers 16 shown in FIG. 3, a first side of the diaphragm may be exposed to an interior of the single accumulator chamber 316 while a second side of the diaphragm may be exposed to an exterior of the manifold 310. The single accumulator chamber 316 may thereby be a compliant chamber and may be located before, after, or at a mixing point of the four fluidic paths. In one embodiment, the entirety of the accumulator chamber 316 may include compliant walls in addition or alternatively to the compliant diaphragm disposed therein. Further, a plurality of beads may be located in the single accumulator chamber, as described above.

Figure 8B:
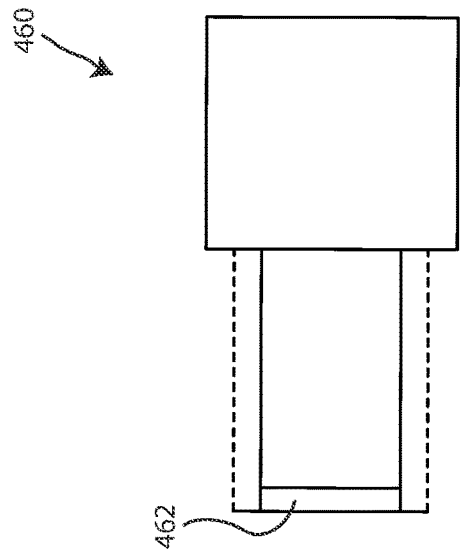
FIG. 8B depicts a side cross sectional view of a flat bottom fitting plug for incorporation into the modular gradient proportioning valve of FIG. 8A, in accordance with one embodiment.
Figure 8C:
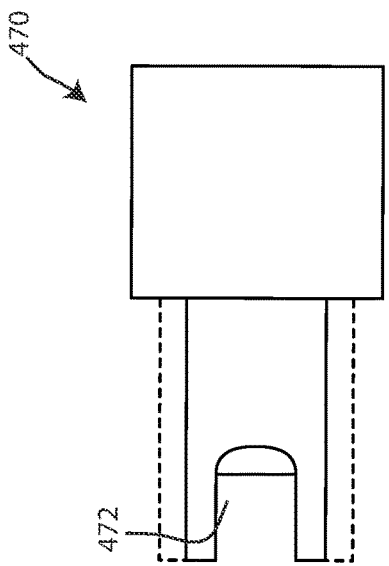
FIG. 8C depicts a side cross sectional view of a diaphragm fitting plug for incorporation into the modular gradient proportioning valve of FIG. 8A, in accordance with one embodiment.
Figure 8A:
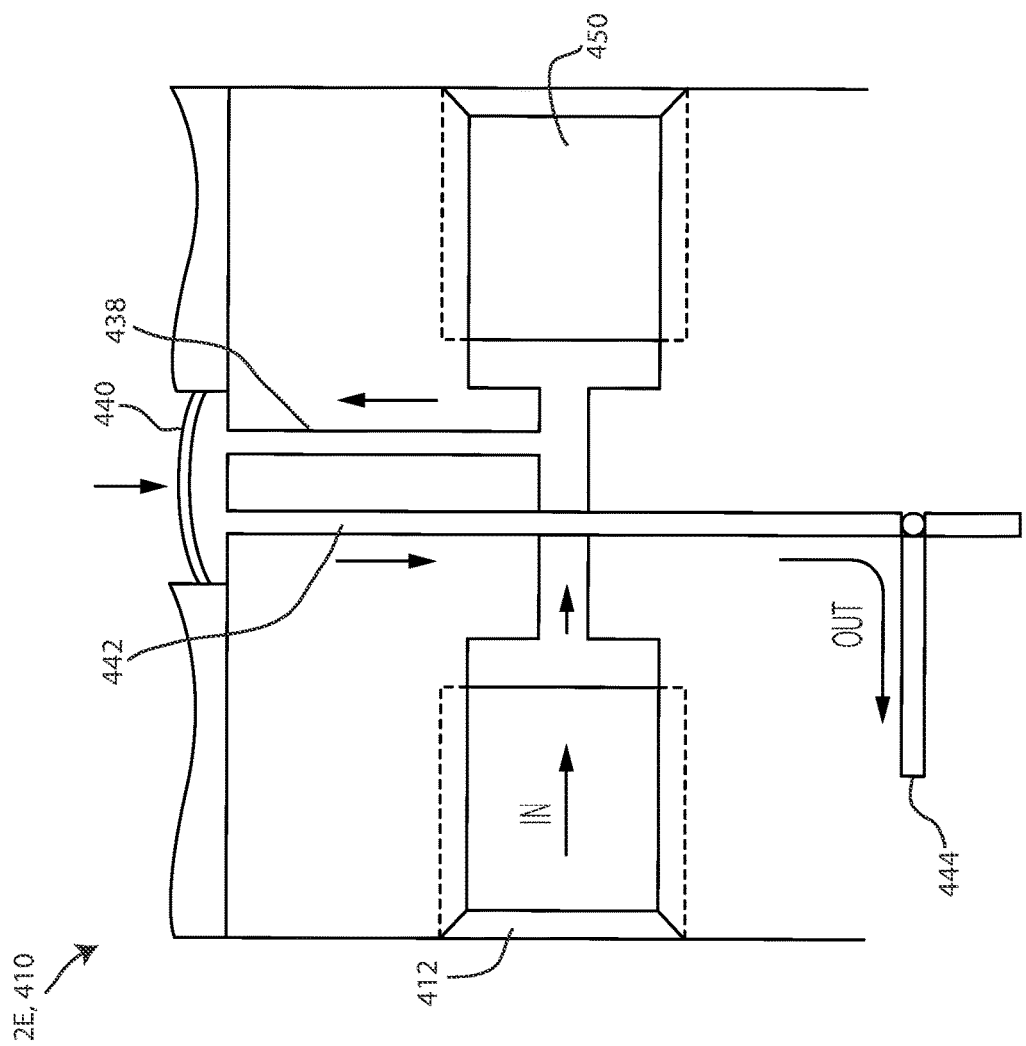
FIG. 8A depicts a side cross sectional view of a portion of a modular gradient proportioning valve, in accordance with one embodiment.

FIG. 8A depicts a side cross sectional view of a portion of a modular gradient proportioning valve 2E, in accordance with one embodiment. The modular gradient proportioning valve 2E includes an inlet port 412, fluidically connected to a modular receiver port 450. A chamber port 438 extends from the modular receiver port 450 to a solenoid diaphragm 440. A common port 442 extends from the solenoid diaphragm 440 to a mixing point after which the fluidic pathway extends to an outlet 444. The modular gradient proportioning valve 2E includes the modular receiver port 450 internal to the manifold 410. While a single of the modular receiver ports 450 are shown, it should be understood that two, three, four or more separate modular receiver ports 450 may be included—one for each fluidic pathway. In other embodiments, a plurality of modular receiver ports 450 may be included within each separate fluidic pathway. Each of the plurality of receiving ports may be configured to be in fluidic communication with one of the fluidic pathways or conduits within the manifold 410. The modular receiver ports 450 may be threaded, for example, to allow for easy removal or attachment of modular fitting plugs. Different fitting plugs may be attached to the same manifold 410, or fitting plugs may be removed or added to the manifold as needed depending on the implementation.

FIGS. 8B and 8C show two exemplary modular fitting plugs. FIG. 8B depicts a side cross sectional view of a flat bottom fitting plug 460 having a flat bottom 462 for incorporation into the modular gradient proportioning valve 2E of FIG. 8A, in accordance with one embodiment. The flat bottom fitting plug may be receivable in the modular receiving port 450 and may include, for example, threads or another attachment mechanism for integrating, attaching, connecting or otherwise coupling to the modular receiving port 450. When inserted and attached within the receiving port 450, the flat bottom 462 of the flat bottom fitting plug 460 may be exposed to the fluidic pathway but may block fluid from entering into the area occupied by the modular receiving port 450. This creates a bypass in the event that it is unnecessary, for example, to damp pressure pulses in a given fluidic pathway within the manifold.

FIG. 8C depicts a side cross sectional view of a diaphragm fitting plug 470 having a diaphragm 472 for incorporation into the modular gradient proportioning valve 2E of FIG. 8A, in accordance with one embodiment. The modular diaphragm fitting plug 470 may be receivable in the modular receiving port 450 and may include, for example, threads or another attachment mechanism for integrating, attaching, connecting or otherwise coupling to the modular receiving port 450. The diaphragm fitting plug 470 may be configured to create an accumulator chamber, including the same or similar structure to the accumulator chambers 16 described hereinabove, internal to the manifold 410 in fluidic communication with the respective one of the fluidic pathways and/or fluidic conduits.

Using any combination of diaphragm fitting plugs 470 and flat bottom fitting plugs 460, the modular gradient proportioning valve 2E may be configured to interchangeably receive various fitting plugs for creating a customizable valve manifold depending on the particular implementation needed. It is further contemplated that different types of diaphragm fittings are contemplated having different characteristics—some may include more compliant or less compliant diaphragms, some may or may not include a beaded chamber, or the like. Various modular combinations are contemplated.

Figure 9B:
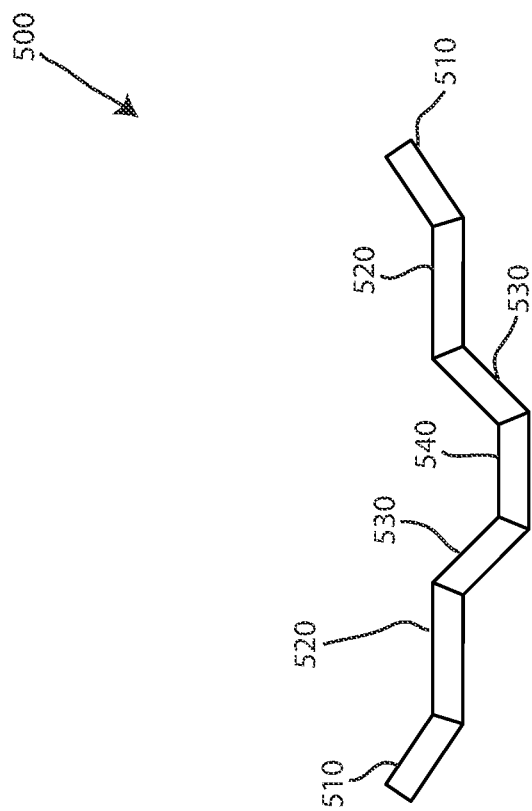
FIG. 9B depicts a side view of the ribbed diaphragm of FIG. 9A, in accordance with one embodiment.
Figure 9A:
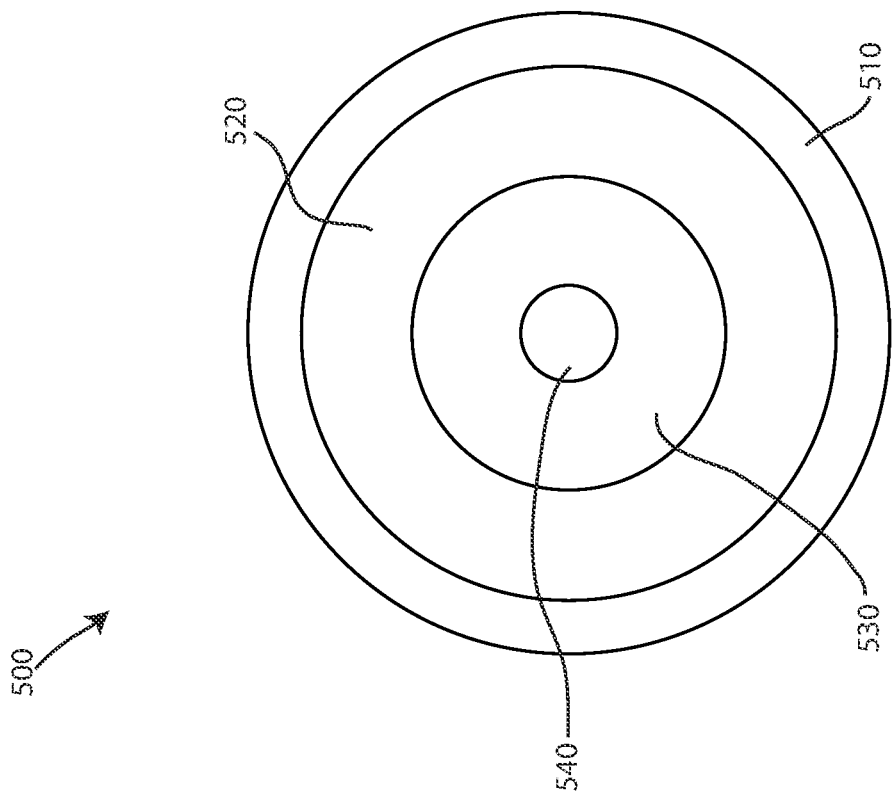
FIG. 9A depicts a top view of a ribbed diaphragm for a gradient proportioning valve, in accordance with one embodiment.

FIG. 9A depicts a top view of a ribbed diaphragm 500 for a gradient proportioning valve, in accordance with one embodiment. FIG. 9B depicts a side view of the ribbed diaphragm 500 of FIG. 9A, in accordance with one embodiment. The ribbed diaphragm 500 includes a geometry that includes a number of concentric ribs defining an interior circumference 540, a first concentric ring 530, a second concentric ring 520, and a third concentric ring 510. As shown in FIG. 9B, the concentric rings get increasingly deeper as the diaphragm 500 approaches the center. The ribs in the diaphragm (where the concentric portions 510, 520, 530, 540 meet) may be flexible such that the diaphragm deepens when subjected to pressure from one side. The ribs may be configured to provide further compliance to the diaphragm 500 while still maintaining a compact form. The compliance of the ribbed diaphragm may be configured to dampen pressure pulses. The ribbed diaphragm 500 may be utilized on any diaphragm within any of the gradient proportioning valves described herein and/or manifolds thereof.

Figure 10A:
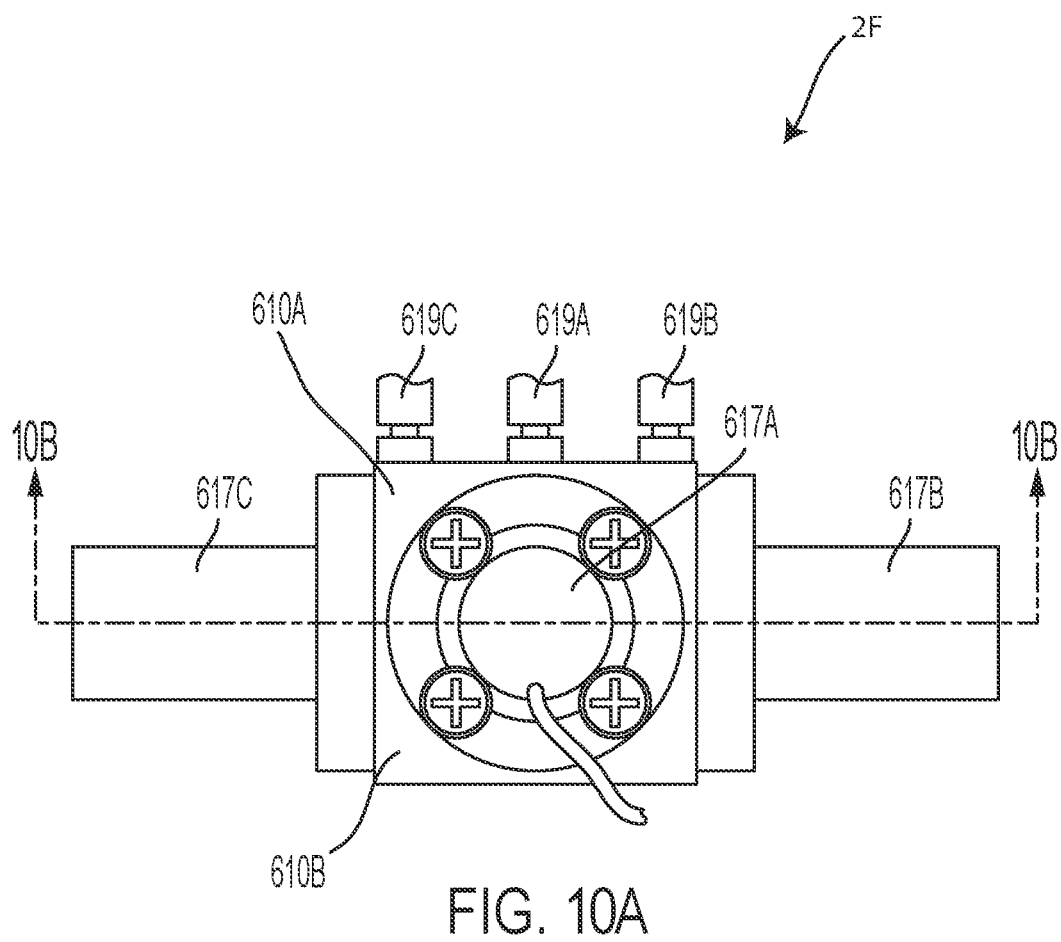
FIG. 10A depicts a side view of a diffusion bonded gradient proportioning valve, in accordance with one embodiment.

FIG. 10A depicts a side view of a diffusion bonded gradient proportioning valve 2F, in accordance with one embodiment. In this embodiment, the gradient proportioning valve and/or manifold thereof includes at two portions that are diffusion bonded together—a top manifold portion 610A and a bottom manifold portion 610B. By creating two separate manifold portions 610A, 610B and diffusing those portions together, different internal geometries can be achieved that would not be machinable using traditional methods using a single block. The valve 2F is shown including three separate solenoid valves 617A, 617B, 617C, although a forth valve (not shown) is hidden on the opposing surface of the manifold. Three separate fluidic inlets 619A, 619B, 619C are shown, although a fourth inlet and an outlet are both hidden behind the first inlet 618A in this side view.

Figure 10B:
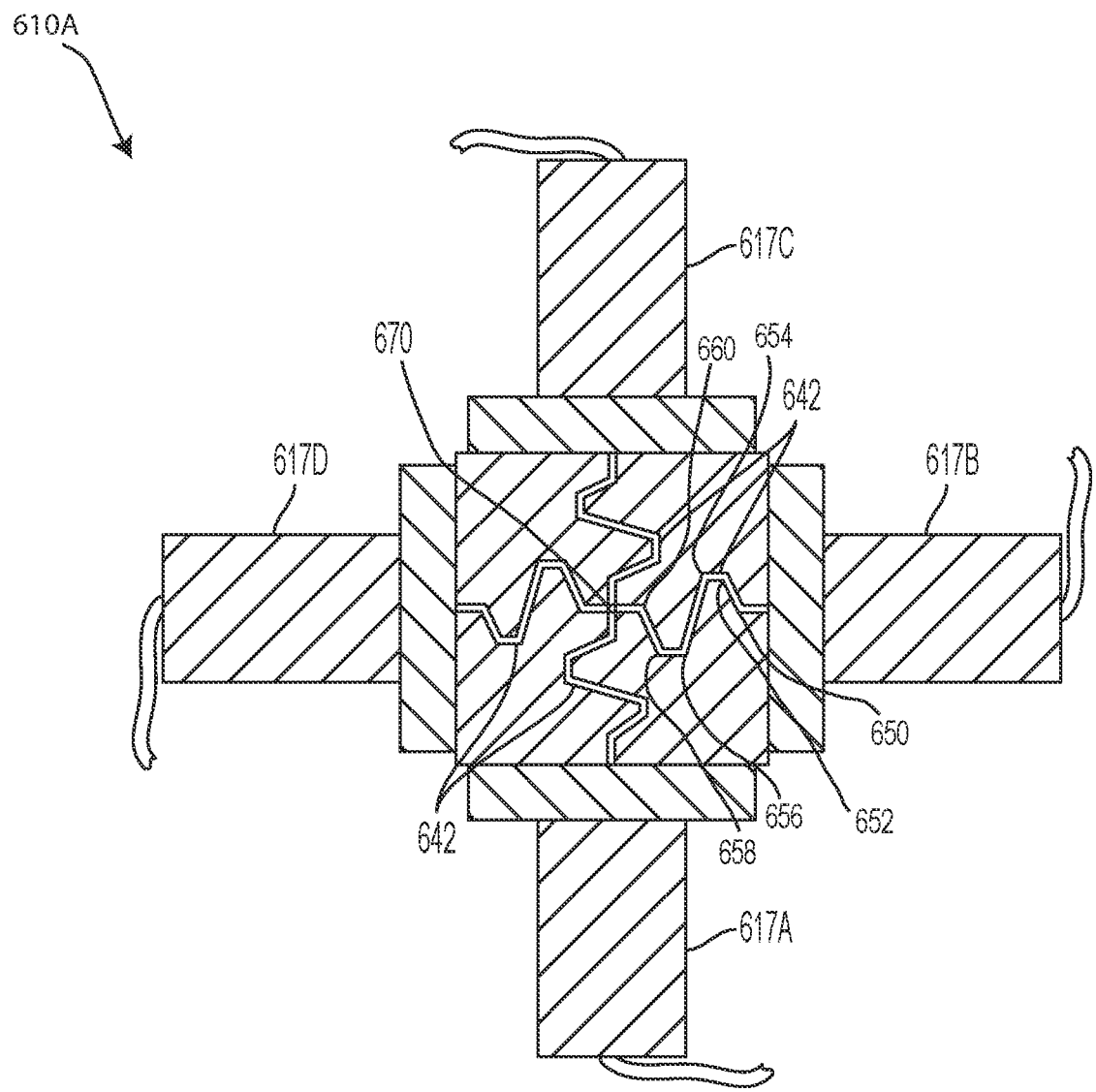
FIG. 10B depicts a top cutaway view of the diffusion bonded gradient proportioning valve of FIG. 10A taken at arrows 10B, in accordance with one embodiment.

FIG. 10B depicts a top cutaway view of the diffusion bonded gradient proportioning valve 2F of FIG. 10A taken at arrows 10B, in accordance with one embodiment. As shown, in this embodiment, the gradient proportioning valve 2F includes fluidic conduits 642 that are bent to create a pulse dampening flow geometry configured to reduce fluidic pressure pulses. In particular, each of the fluidic conduits 642 extends from the respective solenoid valves 617A, 617B, 617C, 617D to a mixing point 670.

These fluid conduits 642 each include a first bend 650 that causes the fluid conduit 642 to depart from a direct line toward the mixing point 670. This bend may be at an angle that is greater than 90 degrees but less than 180 degrees. A second bend 652 may be an equal bend in the opposite direction as the first bend 650. A third bend 654 is also equal in degree to the first two bends 650, 652 and may bend the fluid conduit in the same direction as the second bend 652. The fourth and fifth bends 656, 658 may each bend the fluid conduit in the same direction as the first bend 650, while the sixth and final bend 660 may bend the fluid conduit back toward the mixing point 670 in the same direction as the second and third bends 652, 654. Each of the bends 650, 652, 654, 656, 658, 660 may be at the same angle. The geometry created by the bends in the fluid conduits 642 may be configured to prevent pressure pulses caused by the opening and closing of the solenoid valves 617A, 617B, 617C, 617D to reach the mixing point 670. It should be understood that embodiments contemplated may include any bent flow geometry including any number of bends for each of the respective fluidic paths. In some embodiments, different fluid paths from each of the solenoid valves 617A, 617B, 617C, 617D may have differently shaped bends (or no bends at all) depending on the necessary implementation.

Embodiments of the invention further contemplate methods of mixing fluid using the principles described herein above. Methods of mixing fluid may first include providing a gradient proportioning valve consistent with one or more of the principles described herein and/or a liquid chromatography system having such a gradient proportioning valve. Methods may include receiving a plurality of fluids in a plurality of inlet ports of the gradient proportioning valve and mixing the plurality of fluids in a controlled manner within a manifold of the gradient proportioning valve to provide a fluid composition, the manifold including a plurality of conduits. Methods may include opening and closing each of the plurality of conduits in a controlled manner and outputting the fluid composition from a common outlet port of the gradient proportioning valve.

Methods may further include dampening unwanted fluidic pressure pulses in the manifold with a passive fluidic dampening system.

In some embodiments, the opening and closing each of the plurality of fluid conduits in a controlled manner is performed by a respective solenoid valve, and the method further includes absorbing unwanted fluidic pressure pulses created by the opening and closing of the solenoid valve with an energy absorbing solenoid armature stop located in at least one of the respective solenoid valves.

In some embodiments, methods may include dampening the unwanted fluidic pressure pulses in the manifold with at least one compliant fluid conduit.

In some embodiments, methods may include dampening unwanted fluidic pressure pulses in the manifold with a single accumulator chamber having a diaphragm disposed therein.

In some embodiments, methods may include removably inserting a plurality of modular fitting plugs into a plurality of respective modular receiving ports of the gradient proportioning valve, and dampening the unwanted fluidic pressure pulses in the manifold with at least one of the plurality of modular fitting plugs.

In some embodiments, methods may include dampening the unwanted fluidic pressure pulses in the manifold with a ribbed diaphragm. In some embodiments, methods may include dampening the unwanted fluidic pressure pulses with a compliant seal made of at least one of PTFE, FEP and FFKM.

In some embodiments, methods may include using a bent flow geometry within the manifold to mitigate the unwanted fluidic pressure pulses.

In still other embodiments, methods may include dampening the unwanted fluidic pressure pulses with a plurality of beads located within at least one chamber of the manifold, or within at least one of the plurality of fluid conduits.

In one exemplary embodiment, a method of mixing fluid includes providing a gradient proportioning valve, receiving a plurality of fluids in a plurality of inlet ports of the gradient proportioning valve, mixing the plurality of fluids in a controlled manner within a manifold of the gradient proportioning valve to provide a fluid composition, the manifold including a plurality of fluid conduits. At least one of the plurality of fluid conduits is a compliant fluid conduit. According to some embodiments, all of the plurality of fluid conduits are compliant fluid conduits. The method further includes opening and closing each of the plurality of fluid conduits in a controlled manner, outputting the fluid composition from a common outlet port of the gradient proportioning valve, and dampening the unwanted fluidic pressure pulses in the manifold with the compliant fluid conduit(s). In some embodiments, the opening and closing each of the plurality of fluid conduits in a controlled manner is performed by a respective solenoid valve, such that the method includes absorbing unwanted fluidic pressure pulses created by the opening and closing of at least one of the respective solenoid valves with the compliant fluid conduit located upstream from the at least one of the respective solenoid valves. Still further, the method may include dampening unwanted fluidic pressure pulses in the manifold with a single accumulator chamber having a diaphragm disposed therein. The method may also include dampening the unwanted fluidic pressure pulses with a compliant seal made of at least one of PTFE, FEP and FFKM. The method may further include using a bent flow geometry within the manifold to mitigate the unwanted fluidic pressure pulses. Further, the method may include dampening the unwanted fluidic pressure pulses with a plurality of beads located within at least one chamber of the manifold, or within at least one of the plurality of fluid conduits.

Embodiments of methods include passively dampening or otherwise reducing pressure pulses that occur due to the opening and closing of channels in the fluidic systems of the valve, and in the valve itself. Embodiments also contemplated include methods of expanding a compliant fluid conduit in response to a pressure pulse created by the opening and closing of a valve. Methods include dampening fluidic pressure pulses without an active, or powered dampening device, but rather via passive dampening systems which are configured to automatically dampen pressure pulses from being felt upstream from the gradient proportioning valve. Thus, methods contemplated include improving compositional accuracy across an entire solvent composition range.

While the invention has been shown and described with reference to specific embodiments, it should be understood by those skilled in the art that various changes in form and detail may be made therein without departing from the spirit and scope of the invention as recited in the accompanying claims. Further, while various embodiments of passive forms of fluidic dampening of pressure pulses have been described in detail, these embodiments may be employed in unison, or in combination with some or all of the features described herein being incorporated into a single gradient proportioning valve. Still further, the passive forms of fluidic dampening of pressure pulses can be supplemented in combination with one or more active forms that require power and/or control systems to function.

What is claimed is:

1. A gradient proportioning valve for liquid chromatography comprising:
a plurality of inlet ports configured to receive a plurality of fluids;
a plurality of actuation mechanisms wherein each of the plurality of respective actuation mechanisms is a solenoid valve, wherein each of the plurality of actuation mechanisms includes a passive energy absorbing solenoid armature stop configured to dampen a stop of an armature of the solenoid valve during actuation, wherein the passive energy absorbing solenoid armature stop is made of a compliant material;
a manifold connected to each of the plurality of inlet ports configured to mix the plurality of fluids in a controlled manner to provide a fluid composition, the manifold including a plurality of fluid conduits internal to the manifold, each of the plurality of fluid conduits receiving fluid through a respective one of the plurality of inlet ports, each of the plurality of fluid conduits operatively communicable to a respective actuation mechanism of the plurality of actuation mechanisms configured to open and close each of the plurality of fluid conduits in a controlled manner;
a common outlet port configured to receive the fluid composition; and
a single accumulator chamber internal to the manifold, wherein each of the plurality of fluid conduits provides fluid to the single accumulator chamber, wherein the single accumulator chamber includes a diaphragm disposed therein, a first side of the diaphragm exposed to an interior of the single accumulator chamber and a second side of the diaphragm exposed to an exterior of the manifold.

2. The gradient proportioning valve of claim 1, wherein each of the plurality of fluid conduits includes a compliant portion.

3. The gradient proportioning valve of claim 2, wherein the compliant portion is made of a material selected from the group consisting of Polytetrafluoroethylene (PTFE), Flourinated Ethylene Propylene (FEP) and perfluoroelastomer (FFKM).

4. The gradient proportioning valve of claim 2, and wherein the compliant portion of at least one of the plurality of fluid conduits is located upstream from one of the solenoid valves.

5. The gradient proportioning valve of claim 1, further comprising a plurality of modular receiver ports internal to the manifold, each of the plurality of modular receiver ports in fluidic communication with a respective one of the plurality of fluid conduits.

6. The gradient proportioning valve of claim 5, further comprising at least one modular flat bottom fitting plug received in at least one of the plurality of modular receiving port, the flat bottom exposed to the received fluid from the respective one of the plurality of fluid conduits.

7. The gradient proportioning valve of claim 5, further comprising at least one modular diaphragm fitting plug received in at least one of the plurality of modular receiving ports, the diaphragm fitting plug creating the single accumulator chamber internal to the manifold in fluidic communication with the respective one of the plurality of fluid conduits.

8. The gradient proportioning valve of claim 1, wherein at least one of the plurality of fluid conduits provides fluid to the single accumulator chamber having a ribbed diaphragm disposed therein.

9. The gradient proportioning valve of claim 1, wherein at least one of the plurality of actuation mechanisms includes a compliant seal made of at least one of PTFE, FEP and FFKM.

10. The gradient proportioning valve of claim 1, wherein at least one of the plurality of fluid conduits includes a bent pulse dampening flow geometry configured to mitigate fluidic pressure pulses.

11. The gradient proportioning valve of claim 1, wherein a plurality of beads is located within at least one chamber in the manifold, or within at least one of the plurality of fluid conduits, the plurality of beads configured to reduce pulse amplitude.

12. A liquid chromatography system comprising:
the gradient proportioning valve of claim 1;
an injector;
a separation column; and
a detector.

13. A method of mixing fluid in liquid chromatography comprising:
providing a gradient proportioning valve;
receiving a plurality of fluids in a plurality of inlet ports of the gradient proportioning valve;
mixing the plurality of fluids in a controlled manner within a manifold of the gradient proportioning valve to provide a fluid composition, the manifold including a plurality of fluid conduits, wherein at least one of the plurality of fluid conduits is a compliant fluid conduit having an entire wall of a fluidic channel being made of a compliant material that is in-line with flow of the plurality of fluids;
opening and closing each of the plurality of fluid conduits in a controlled manner;
outputting the fluid composition from a common outlet port of the gradient proportioning valve;
dampening unwanted fluidic pressure pulses in the manifold with the compliant fluid conduit; and
dampening unwanted fluidic pressure pulses in the manifold with an accumulator chamber having a diaphragm disposed therein.

14. The method of claim 13, wherein the opening and closing each of the plurality of fluid conduits in a controlled manner is performed by a respective solenoid valve, the method further comprising:
absorbing unwanted fluidic pressure pulses created by the opening and closing of at least one of the respective solenoid valves with the compliant fluid conduit located upstream from the at least one of the respective solenoid valves.

15. The method of claim 13, wherein each of the plurality of fluid conduits is a compliant fluid conduit, the method further comprising dampening the unwanted fluidic pressure pulses in the manifold with each of the plurality of compliant fluid conduits.

16. The method of claim 13, further comprising:
dampening the unwanted fluidic pressure pulses with a compliant seal made of at least one of PTFE, FEP and FFKM.

17. The method of claim 13, further comprising:
using a bent flow geometry within the manifold to mitigate the unwanted fluidic pressure pulses.

18. The method of claim 13, further comprising:
dampening the unwanted fluidic pressure pulses with a plurality of beads located within at least one chamber of the manifold, or within at least one of the plurality of fluid conduits.

* * * * *